(12) United States Patent
Irving et al.

(10) Patent No.: US 12,022,948 B1
(45) Date of Patent: Jul. 2, 2024

(54) MONITOR AND CONFERENCE BAR MOUNT

(71) Applicant: Biamp Systems, LLC, Beaverton, OR (US)

(72) Inventors: Dale Irving, Oregon City, OR (US); Zach Snook, Beaverton, OR (US)

(73) Assignee: Biamp Systems, LLC, Beaverton, OR (US)

( * ) Notice: Subject to any disclaimer, the term of this patent is extended or adjusted under 35 U.S.C. 154(b) by 0 days.

(21) Appl. No.: 18/160,667

(22) Filed: Jan. 27, 2023

(51) Int. Cl.
*A47B 97/00* (2006.01)
*F16M 13/02* (2006.01)

(52) U.S. Cl.
CPC .............. *A47B 97/00* (2013.01); *F16M 13/02* (2013.01); *A47B 2097/005* (2013.01); *F16M 2200/027* (2013.01)

(58) Field of Classification Search
CPC .. A47B 97/00; A47B 2097/005; F16M 13/02; F16M 2200/027
USPC ..................................................... 248/297.21
See application file for complete search history.

(56) References Cited

U.S. PATENT DOCUMENTS

| | | | |
|---|---|---|---|
| 9,045,918 B2 * | 6/2015 | Sargent | A01G 20/47 |
| 9,046,214 B2 * | 6/2015 | Chang | F16M 11/046 |
| 9,125,502 B2 * | 9/2015 | Gwag | A47F 5/0846 |
| 9,976,699 B2 * | 5/2018 | Hung | F16M 11/24 |
| 11,849,846 B1 * | 12/2023 | Hewatt | A47B 96/067 |

* cited by examiner

*Primary Examiner* — Todd M Epps

(57) ABSTRACT

One example may include a media bar mount that mounts to a display mount affixed to a display, and the media bar mount has rails, a cursor and an arced spring support affixed to each of the rails, a friction brake affixed to each cursor and to extension arms, and a cross-bar affixed perpendicular to the one or more extension arms.

8 Claims, 5 Drawing Sheets

MONITOR AND CONFERENCE BAR MOUNT

TECHNICAL FIELD

This application generally relates to a mount and more specifically to an integrated display and auxiliary device mount.

BACKGROUND

Conventionally, displays (e.g., monitors, televisions, etc.) are mounted on a wall via a bracket system that provides a securing system for the display alone. The display is usually integrated with some auxiliary device, such as a cable input device, such as a TV remote controller, a soundbar, a camera, a VCR, a DVD player, etc. The auxiliary device is left to a table, a desk, the floor, etc., and can become an obstacle to contend with when trying to consolidate the area that is used for electronic equipment.

Displays are becoming increasingly popular in conference environments, such as a workplace or other business center. The general conference components include a display, a speaker, a camera and a microphone so users can congregate and talk and share visualizations with a remote party while watching a similar configuration provided by the remote party on the display and hearing audio via the accompanying speaker system. Displays are best suited for use by mounting them to a wall or other surface to free-up spaced in a conference room. Ideally, more components would be mounted for added convenience.

SUMMARY

One example embodiment may provide a media bar mount configured to mount to a display mount affixed to a display with one or more rails, a cursor and an arced spring support affixed to each of the one or more rails, a friction brake affixed to each cursor and to one or more extension arms, and a cross-bar affixed perpendicular to the one or more extension arms.

Another example embodiment may include one or more rails affixed to a display, a cursor affixed to each of the one or more rails, a friction brake affixed to each cursor and to one or more extension arms which are extending below a surface area of the display, and a cross-bar affixed perpendicular to the one or more extension arms disposed under the display.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Figure 1:
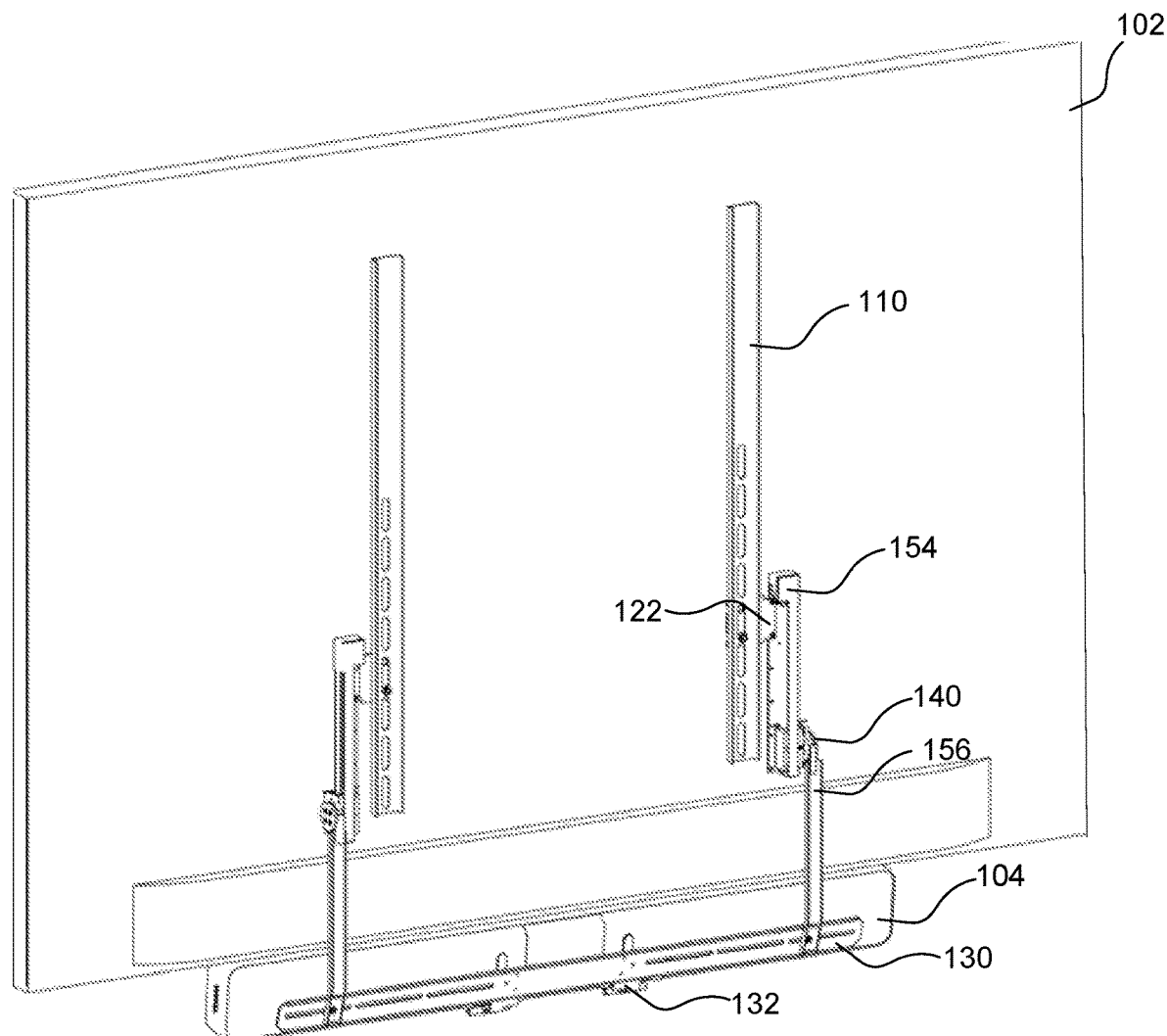
FIG. 1 illustrates rear view of a display with the integrated display and conference bar mount according to example embodiments.

FIG. 1 illustrates rear view of a display with the integrated display and conference bar mount according to example embodiments. Referring to FIG. 1, the display 102 is the backside of a television or monitor type of device. The display rails 110 are affixed to the back of the display 102 by screws similar to the rails installed for a television mount. In order to integrate the conference bar 104 with the existing display mount rail system 110, there are another set of rails which will be referred to as bar rails 154. The term bar is synonymous with a sound bar similar to the size and shape of the bar 104 illustrated. The conference equipment may include a bar that includes one or more speakers, microphones, video cameras, sensors, etc. The term 'conference bar' will be used to indicate such a system, however, a regular sound bar or related device may be used instead.

The bar rails 154 are affixed to the existing rails by a slot mount 122 which has grooves and can be secured by screws, and may support the friction brake system 140 of the conference bar mount. The friction brake system 140 permits movement of the conference bar and adjustments in the forward and backward position as well as the distance between the display and the bar. Also, the entire configuration can be moved to the top of the display depending on the preferences of the user. The arms 156 are attached to the friction brake system 140 and may attach to a perpendicular cross-bar 130 that is affixed to the conference bar 104. Cross-bar supports 132 are also affixed to the cross-bar 130 by screws to provide a support under the conference bar 104.

The conference bar mount can be integrally attached either to the underside or the top of the display and may be installed quickly and easily using standard tools, such as those which are used to mount a screen display. The conference bar mount can be moved into a functional position without use of additional tools. The conference bar mount attaches to an existing screen display mount hardware and no additional attachment or fixation to a wall is required. The mount works with a wide variety of Video Electronics Standards Association (VESA) dimensions. The conference bar mount supports the conference bar and permits its position to change relative to the display screen to be substantially vertically or to adjust its fore and aft positions in relation to the adjacent wall. The conference bar can additionally be rotated about a friction hinge on its mounting plate. The vertical weight of the conference bar is balanced in by the constant-force spring 148 for inches of an available stroke, the spring 148 is held by a spring support 150 on one end and a screw attachment to a cursor 152 on the other end which translates on a rail 154.

The fore-aft positioning is managed using the friction brake system 140 which includes a brake rotor 144 between a stator 142 and a clamp 146 secured by screws 147. The conference bar may be configured to be mounted under or over (above) the display without flipping (inverting) the conference bar.

Figure 2:
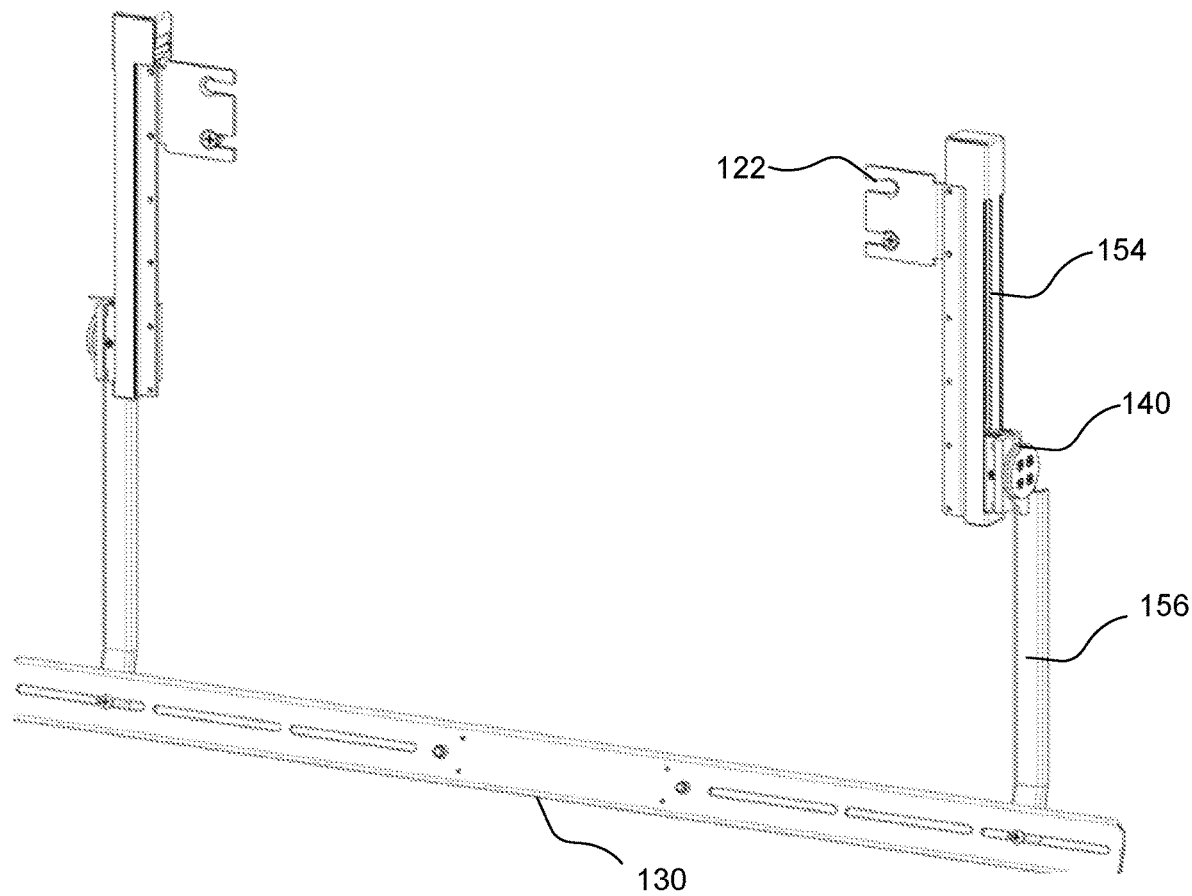
FIG. 2 illustrates the conference bar mount component of the integrated display and conference bar mount according to example embodiments.

FIG. 2 illustrates the conference bar mount component of the integrated display and conference bar mount according to example embodiments. Referring to FIG. 2, the conference bar mount is illustrated without the display mount rails. The slot mount 122 is a forked plate with slots for the screws to be secured to the plate to secure the plate to the conference bar rail 154. The top of the rail has a spring support 150 as a curved surface to hold the constant force spring 148 in a fixed position along the rail body (see FIG. 3). The arms 156 are attached to the brake system 140 which includes a stator 142, a brake rotor 144 and a clamp 146 secured together by screws 147. The brake system 140 is attached to an arm 156 which is secured to the cross-bar 130.

Figure 3:
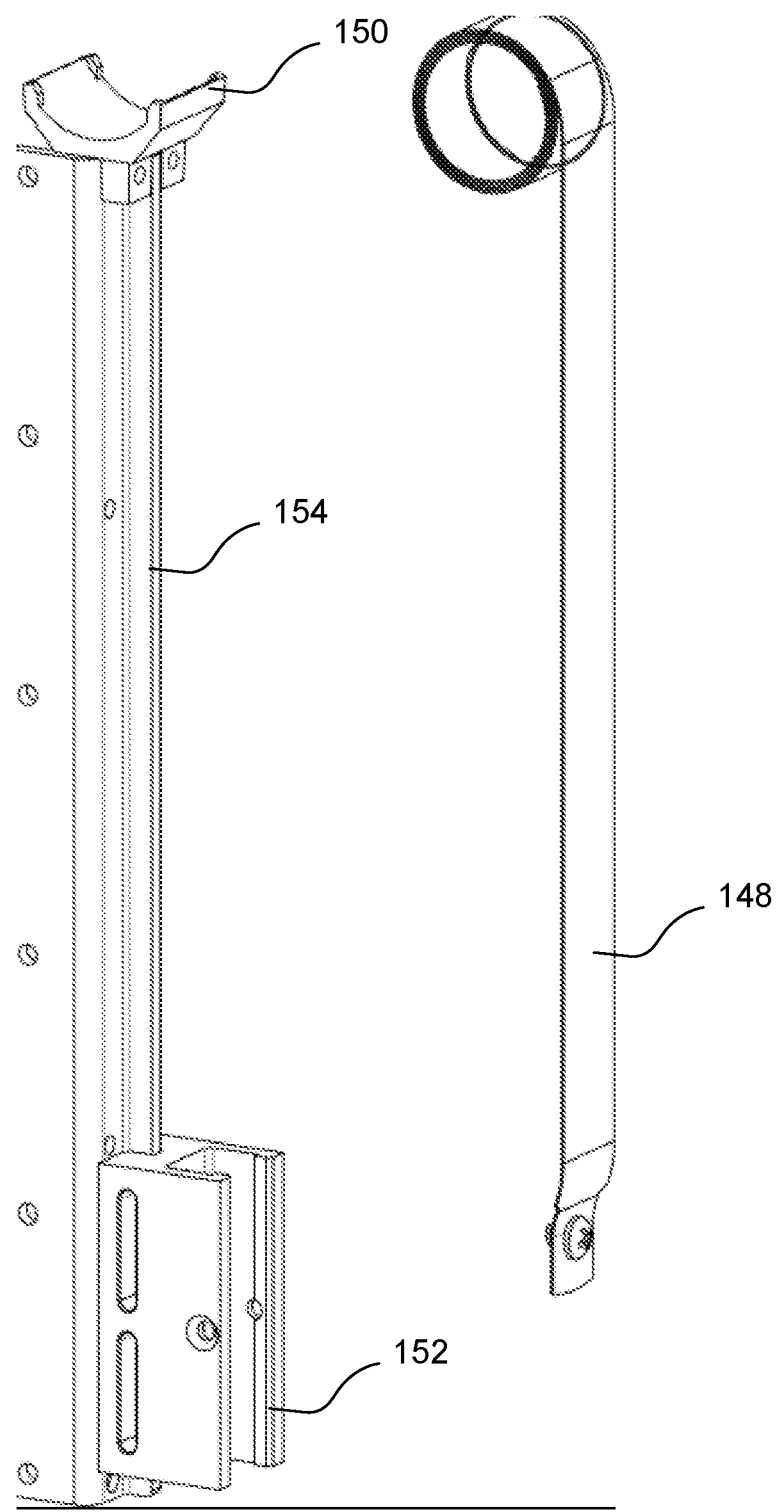
FIG. 3 illustrates the rail and constant-force spring component of the conference bar mount according to example embodiments.

FIG. 3 illustrates the rail and constant-force spring component of the conference bar mount according to example embodiments. Referring to FIG. 3, the close-up view of the of the constant-force spring 148 demonstrates the top portion which is coiled and which is positioned on the curved surface of the spring support 150. The rail 154 supports the spring support 150 and is affixed to the cursor 152.

Figure 4:
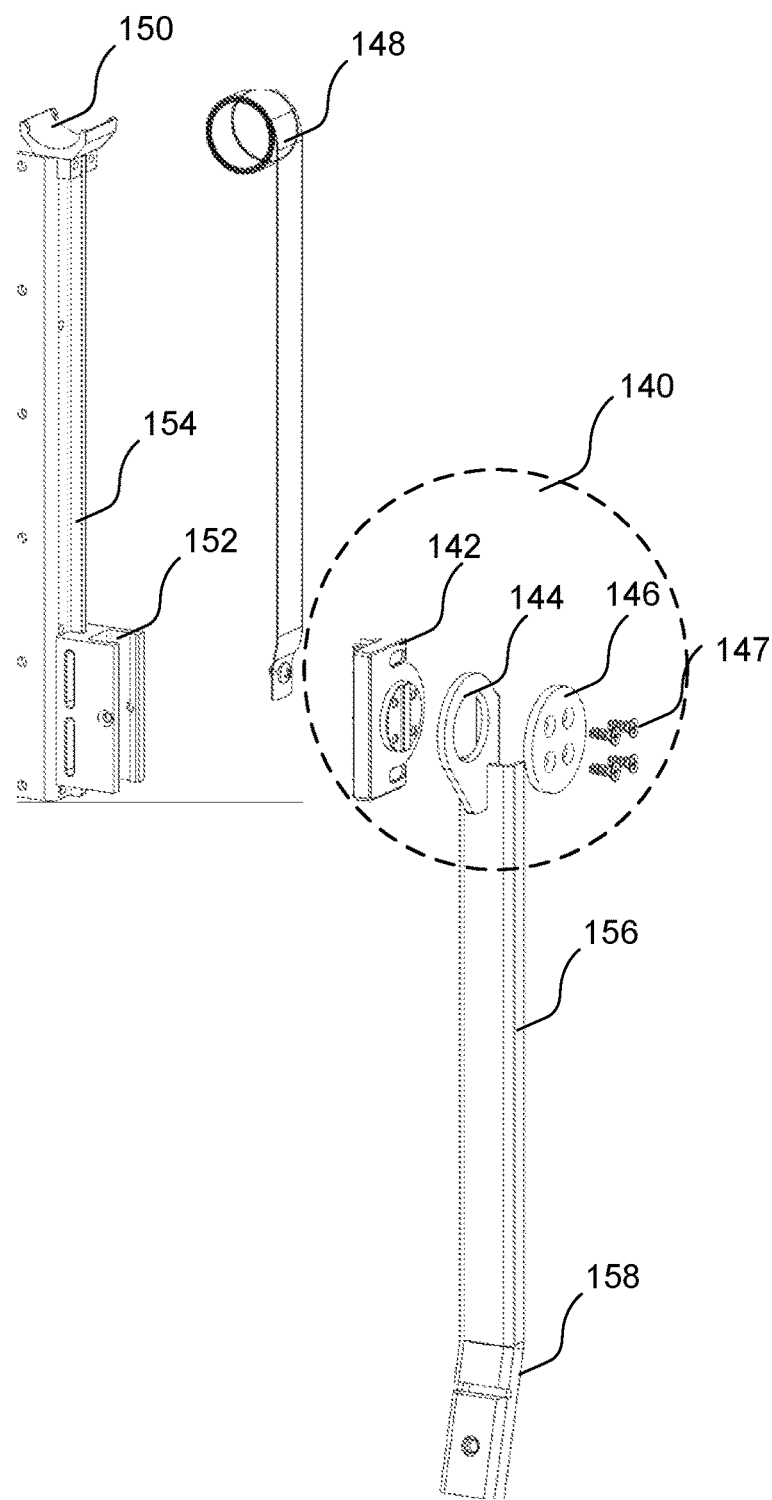
FIG. 4 illustrates a detailed exploded view of the constant-force spring, support rail and friction brake component according to example embodiments.

FIG. 4 illustrates a detailed exploded view of the constant-force spring, support rail and friction brake component according to example embodiments. Referring to FIG. 4, the brake system 140 includes the stator 142 which is affixed to the constant-force spring 148 and the cursor so the arm 156 can be attached to the cross-bar 130 at an angled elbow portion 158 of the arm 156. In operation, the arms can be raised and lowered and the position of the arms can also be shifted forward or backward to enable the conference bar to be lowered, raised, brought forward and/or pushed back. The brake rotor 144 rotates around an axis of the stator 142 to enable the positioning. The constant-force spring 148 connects to the cursor 152 with a screw. The stator 142 attaches to the cursor 152. The device includes two pieces to permit for a cover, that hides and protects the spring 148. The cover itself is for aesthetic purposes. The forward and backward positioning for the rail system and the conference bar placed therein is held in place by the friction brake system 140, while the down/up position is 'balanced' with the constant force spring 148.

Figure 5:
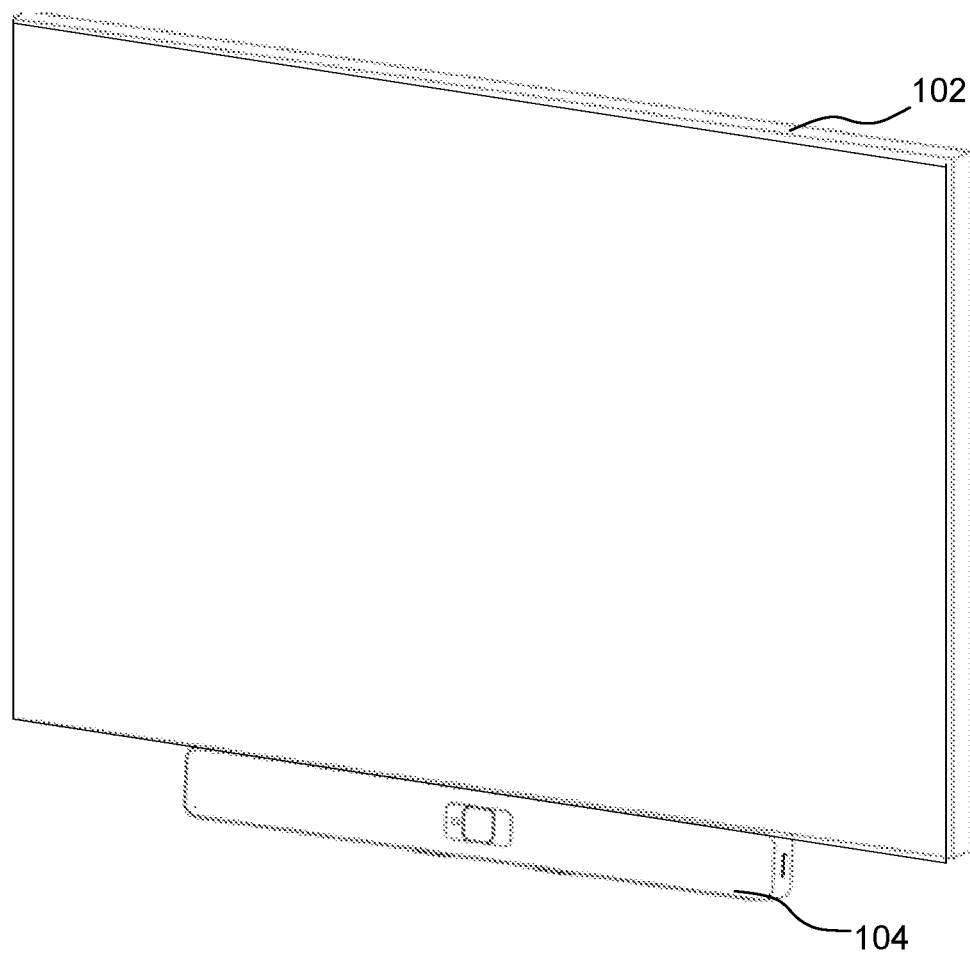
FIG. 5 illustrates a front view of the display and conference bar affixed to one another in a hung position according to example embodiments.

FIG. 5 illustrates a front view of the display and conference bar affixed to one another in a hung position according to example embodiments. Referring to FIG. 5, the display 102 is illustrated with the conference bar 104 positioned at the bottom of the display. The conference bar 104 could be lowered further, moved backward and/or forward, or the conference bar support system could be moved to the top of the display to have the conference bar above the display depending on the preferences of the user.

In one example, the media bar mount is configured to mount to a display mount affixed to a display. In general, the media bar mount portion will have two rails and each rail will have a cursor and an arced spring support affixed to each of the one or more rails, a friction brake affixed to each cursor and to two extension arms, and a cross-bar affixed perpendicular to the one or more extension arms. The cross-bar will generally have one, two or more supports affixed thereto to support bar as it lays against the supports. The media bar mount will also have a friction brake affixed to rail and each friction brake is composed of a stator affixed to the cursor, a brake rotor with a circular cavity that rests against the stator, and a circular clamp that holds the brake rotor and the stator in place by one or more screws. Also, one or more slot mounts are affixed to the one or more rails and to one or more display rails affixed to the back of a display. Each of the bar rails includes a constant force spring affixed to the arced spring support and to the cursor, and the constant force spring holds the extension arm at a fixed and adjustable position above or below the display.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications thereto.

What is claimed is:

1. An apparatus comprising:
one or more rails;
a cursor and an arced spring support affixed to each of the one or more rails;
a friction brake affixed to each cursor and to one or more extension arms; and
a cross-bar affixed perpendicular to the one or more extension arms.

2. The apparatus of claim 1, wherein the friction brake comprises
a stator affixed to the cursor;
a brake rotor with a circular cavity that rests against the stator; and
a circular clamp that holds the brake rotor and the stator in place by one or more screws.

3. The apparatus of claim 1, comprising
one or more slot mounts affixed to the one or more rails and to one or more rails affixed to a back of a display.

4. The apparatus of claim 1, comprising
a constant force spring affixed to the arced spring support and to the cursor, wherein the constant force spring holds the extension arm at a fixed and adjustable position above or below a display to which the extension arm is mounted.

5. An apparatus comprising:
one or more rails affixed to a display;
a cursor affixed to each of the one or more rails;
a friction brake affixed to each cursor and to one or more extension arms which are extending below a surface area of the display; and a cross-bar affixed perpendicular to the one or more extension arms which is disposed under the display.

6. The apparatus of claim 5, wherein the friction brake comprises
- a stator affixed to the cursor;
- a brake rotor with a circular cavity that rests against the stator; and
- a circular clamp that holds the brake rotor and the stator in place by one or more screws.

7. The apparatus of claim 5, comprising
one or more slot mounts affixed to the one or more rails and to one or more rails affixed to a back of the display.

8. The apparatus of claim 5, comprising
a constant-force spring affixed to an arced spring support and to the cursor, wherein the constant-force spring holds the extension arm at a fixed and adjustable position above or below the display to which the extension arm is mounted.

* * * * *